United States Patent
Jones

(10) Patent No.: US 8,806,802 B2
(45) Date of Patent: *Aug. 19, 2014

(54) FISHING LURE

(76) Inventor: Charles Frederick Jones, Duncan (CA)

(*) Notice: Subject to any disclaimer, the term of this patent is extended or adjusted under 35 U.S.C. 154(b) by 419 days.

This patent is subject to a terminal disclaimer.

(21) Appl. No.: 13/086,511

(22) Filed: Apr. 14, 2011

(65) Prior Publication Data

US 2012/0260560 A1 Oct. 18, 2012

(51) Int. Cl.
*A01K 85/14* (2006.01)

(52) U.S. Cl.
USPC .............................. 43/42.5; 43/17.1; 43/42.32

(58) Field of Classification Search
USPC ................. 43/42.5, 42.51, 42.52, 17.1, 42.32
See application file for complete search history.

(56) References Cited

U.S. PATENT DOCUMENTS

| | | | |
|---|---|---|---|
| 261,194 A * | 7/1882 | Wylly | 43/42.51 |
| 570,687 A * | 11/1896 | Stanley | 43/42.51 |
| 632,554 A * | 9/1899 | Dukes | 43/42.51 |
| 770,858 A * | 9/1904 | Hornung | 43/42.51 |
| 804,206 A * | 11/1905 | Bruton | 43/42.51 |
| 1,303,467 A * | 5/1919 | Ettershank | 43/42.51 |
| 1,444,338 A * | 2/1923 | Doering | 43/42.5 |
| 1,566,059 A * | 12/1925 | Willson | 43/42.51 |
| 1,692,674 A * | 11/1928 | Mapel | 43/42.5 |
| 1,742,934 A * | 1/1930 | Richardson | 43/42.5 |
| 1,805,416 A * | 5/1931 | Raymond | 43/42.5 |
| 1,809,663 A * | 6/1931 | Allen | 43/42.5 |
| 1,831,267 A * | 11/1931 | Schwarz | 43/42.51 |
| 1,852,620 A * | 4/1932 | Martin | 43/42.5 |
| 1,938,653 A * | 12/1933 | Bardon | 43/42.5 |
| 1,940,604 A * | 12/1933 | Pflueger | 43/42.52 |
| 1,991,142 A * | 2/1935 | Eggleston | 43/42.51 |
| 1,997,802 A * | 4/1935 | Meyer | 43/42.52 |
| 2,001,055 A * | 5/1935 | De Witt | 43/42.51 |
| 2,003,976 A * | 6/1935 | Raymond | 43/42.32 |
| 2,017,486 A * | 10/1935 | Chester | 43/42.51 |

(Continued)

FOREIGN PATENT DOCUMENTS

| | | |
|---|---|---|
| CA | 986306 | 3/1976 |
| CA | 1287210 | 8/1991 |

(Continued)

OTHER PUBLICATIONS

Dirac Delta Consultants Ltd. Electromotive Series, Science & Engineering Encyclopaedia Version 2.5, http://www.diracdelta.co.uk/science/source/e/l/electromotive%20series/source.html, 2 pp., downloaded Mar. 1, 2011.

(Continued)

*Primary Examiner* — Darren W Ark
(74) *Attorney, Agent, or Firm* — Sander R. Gelsing

(57) ABSTRACT

A metal fishing lure having the appearance, action and small electrical charge of an injured bait fish. The front portion is planar but the rear portion is curved, the curve characterized by a transverse bend and a slight twist about the longitudinal axis. The lure is precisely balanced so that, when pulled through the water, the twist causes the lure to roll x times clockwise, winding up the leader, whereupon the bend and the weight of the lure cause the leader to unwind then wind up counter-clockwise, so that the lure rolls counter-clockwise, settling into a reverses roll action of 2x rolls in one direction, then 2x rolls in the opposite direction, repeated indefinitely. This realistic action induces game fish to strike in a reaction bite.

18 Claims, 3 Drawing Sheets

(56) References Cited

U.S. PATENT DOCUMENTS

| | | | | |
|---|---|---|---|---|
| 2,058,121 A * | 10/1936 | Allen | | 43/42.5 |
| 2,124,152 A * | 7/1938 | Salm | | 43/42.5 |
| 2,214,266 A * | 9/1940 | Haury | | 43/42.52 |
| 2,236,023 A * | 3/1941 | Turner | | 43/42.51 |
| 2,244,378 A * | 6/1941 | Turner | | 43/42.14 |
| 2,256,346 A * | 9/1941 | Campbell | | 43/42.52 |
| 2,280,197 A * | 4/1942 | Ounsworth | | 43/42.52 |
| 2,315,307 A * | 3/1943 | Wilson | | 43/42.5 |
| 2,608,787 A * | 9/1952 | Krogue | | 43/42.51 |
| 2,624,147 A * | 1/1953 | Round | | 43/42.5 |
| 2,665,516 A * | 1/1954 | Race | | 43/42.51 |
| 2,667,007 A * | 1/1954 | Heron | | 43/42.5 |
| 2,680,320 A * | 6/1954 | Rothbard | | 43/42.5 |
| 2,736,982 A * | 3/1956 | Curtis | | 43/42.51 |
| 2,765,570 A * | 10/1956 | Sedivy | | 43/42.5 |
| 2,778,145 A * | 1/1957 | Momb | | 43/42.51 |
| 2,796,693 A * | 6/1957 | Gunterman | | 43/42.5 |
| 2,805,512 A * | 9/1957 | Bunce | | 43/42.18 |
| 2,891,344 A * | 6/1959 | Hottowe | | 43/42.5 |
| 2,904,922 A * | 9/1959 | Orebaugh | | 43/42.51 |
| 2,907,132 A * | 10/1959 | Arvo | | 43/42.51 |
| D188,055 S * | 5/1960 | Phillips | | 43/42.5 |
| 2,945,317 A * | 7/1960 | Wittmann, Jr. | | 43/42.5 |
| 2,982,048 A * | 5/1961 | McGarry et al. | | 43/42.5 |
| 2,986,812 A * | 6/1961 | Arter, Jr. et al. | | 43/42.5 |
| 3,056,228 A * | 10/1962 | Stackhouse | | 43/42.51 |
| 3,145,497 A * | 8/1964 | Aho | | 43/42.5 |
| 3,197,910 A * | 8/1965 | Colangelo | | 43/42.51 |
| 3,235,999 A * | 2/1966 | Wieszeck | | 43/17.1 |
| 3,264,775 A * | 8/1966 | Nahigian | | 43/42.5 |
| 3,403,469 A * | 10/1968 | Whitney | | 43/42.5 |
| 3,418,744 A * | 12/1968 | Panicci | | 43/42.5 |
| 3,656,253 A * | 4/1972 | Gaunt | | 43/42.51 |
| 3,673,727 A * | 7/1972 | Bauer | | 43/42.5 |
| 3,673,728 A * | 7/1972 | Danbrova | | 43/42.51 |
| 3,685,191 A | 8/1972 | Metzger | | |
| D228,553 S * | 10/1973 | Sanderson | | 43/42.5 |
| 3,881,271 A * | 5/1975 | Jacura | | 43/42.5 |
| 3,981,096 A * | 9/1976 | Toivonen | | 43/42.5 |
| 4,075,778 A * | 2/1978 | Howard | | 43/42.5 |
| 4,139,962 A * | 2/1979 | Gardyszewski | | 43/42.5 |
| 4,142,318 A * | 3/1979 | Morrell | | 43/42.5 |
| 4,174,584 A * | 11/1979 | Howard | | 43/42.5 |
| 4,201,006 A * | 5/1980 | Wetherald | | 43/42.51 |
| 4,471,557 A * | 9/1984 | Gage | | 43/42.5 |
| 4,475,302 A * | 10/1984 | Jakeway | | 43/42.5 |
| 4,479,323 A * | 10/1984 | Burr | | 43/42.5 |
| 4,501,087 A * | 2/1985 | Blomquist | | 43/42.51 |
| 4,891,901 A * | 1/1990 | Baker, Jr. | | 43/42.11 |
| 4,970,808 A * | 11/1990 | Massie | | 43/17.1 |
| 5,175,950 A * | 1/1993 | Linder | | 43/17.1 |
| 5,367,816 A * | 11/1994 | Gabos et al. | | 43/42.5 |
| 5,903,999 A | 5/1999 | Petras | | |
| 6,108,964 A | 8/2000 | Noorlander | | |
| 6,161,325 A * | 12/2000 | Moore | | 43/42.5 |
| 6,301,823 B1 * | 10/2001 | Monticello et al. | | 43/42.5 |
| 6,457,275 B1 | 10/2002 | Spurgeon | | |
| 6,643,975 B1 * | 11/2003 | Edwards | | 43/42.51 |
| 7,216,456 B2 * | 5/2007 | Kaariainen et al. | | 43/42.5 |
| 7,240,453 B1 | 7/2007 | Safwat | | 43/17.1 |
| 7,610,713 B1 * | 11/2009 | Eilers | | 43/43.13 |
| 7,621,068 B1 * | 11/2009 | Renosky | | 43/42.5 |
| 7,627,978 B2 * | 12/2009 | Davis | | 43/42.5 |
| 7,722,218 B2 | 5/2010 | Leung et al. | | |
| 8,245,437 B1 * | 8/2012 | Yelton | | 43/42.5 |
| 2002/0056222 A1 * | 5/2002 | Andersen | | 43/42.5 |
| 2005/0252069 A1 * | 11/2005 | Pool et al. | | 43/42.51 |
| 2006/0265932 A1 | 11/2006 | Davis | | |
| 2009/0094879 A1 * | 4/2009 | Beck | | 43/42.51 |
| 2013/0139428 A1 * | 6/2013 | Smith et al. | | 43/17.1 |

FOREIGN PATENT DOCUMENTS

| | | | | |
|---|---|---|---|---|
| CA | 2047387 | | 1/1993 | |
| CA | 2556726 | | 2/2008 | |
| CA | 2681472 | | 9/2008 | |
| CA | 2599267 | | 3/2009 | |
| CA | 2626707 | | 3/2009 | |
| CA | 2637822 | | 3/2009 | |
| CH | 679102 A5 * | | 12/1991 | A01K 85/14 |
| FR | 2566996 A1 * | | 1/1986 | A01K 85/14 |
| GB | 2269517 A * | | 2/1994 | A01K 85/14 |
| JP | 09070243 A * | | 3/1997 | A01K 85/14 |

OTHER PUBLICATIONS

U.S. Department of the Interior, Fish and Wildlife Service and U.S. Department of Commerce, Bureau of the Census. (1997). 1996 National Survey of Fishing, Hunting and Wildlife-Associated Recreation, p. 8. Downloaded Apr. 8, 2011 from http://www.census.gov/prod/3/97pubs/fhw96nat.pdf.

* cited by examiner

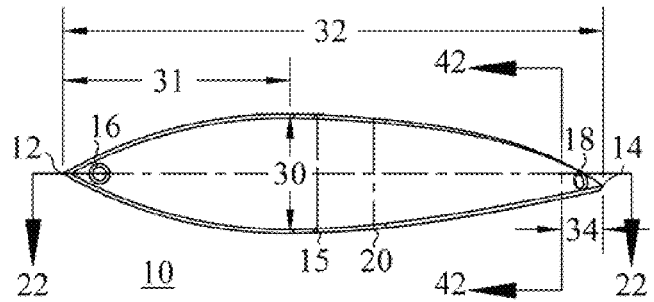
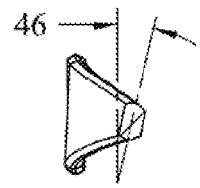
FIG. 12
FIG. 13
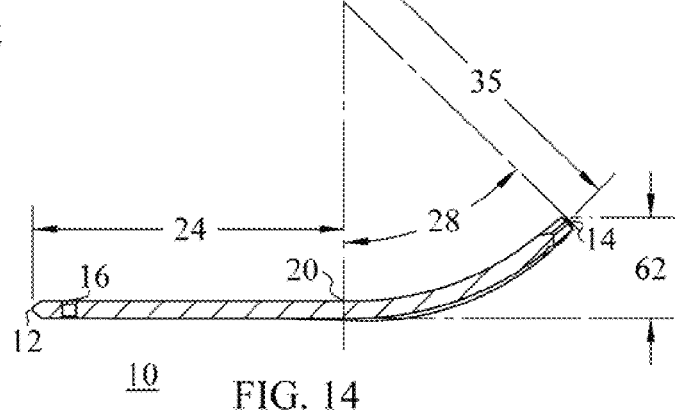
FIG. 14
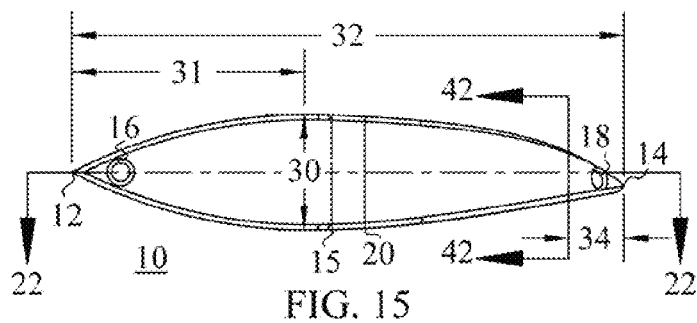
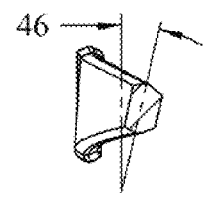
FIG. 15
FIG. 16
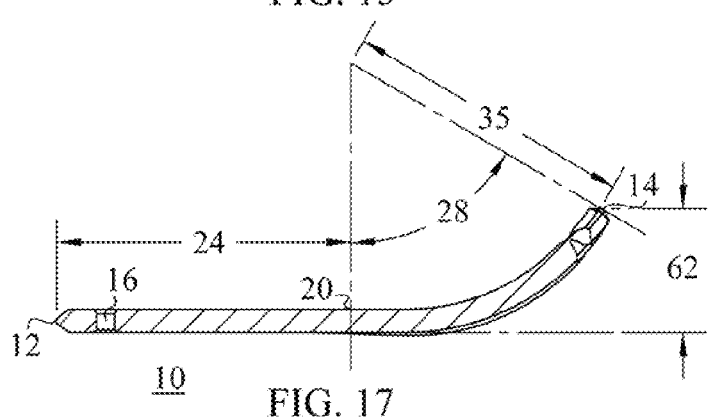
FIG. 17

FISHING LURE

FIELD OF THE INVENTION

The present invention relates to fishing lures.

BACKGROUND OF THE INVENTION

There is a seemingly inexhaustible market for fishing equipment, no matter what the economic climate. Fishing is an essential industry, and it is also an immensely popular sport. According to the U.S. Department of the Interior, Fish and Wildlife Service (1997), in 1996, 35 million people in the U.S. spent $38 billion on fishing-related expenses. That means millions of sport fishers are looking for an irresistible lure. However, there are so many variables to take into account that most fishers bring dozens of lures on their expeditions, and make their choice depending on their equipment, technique, the species of fish they expect to catch, weather, season, the water's depth, clarity and action and their own intuition. Commercial fishers also seek durable and dependable lures and must constantly replenish their supply. Although natural bait works well, it is perishable, so there is always a demand for a better artificial lure to suit each unique situation.

The prior art consists of a wide variety of artificial lures to meet different needs, but not all lures are equally well-designed to attract, capture and/or hold fish. Some lures such as U.S. Pat. No. 3,685,191 to Metzger have fixed hooks attached, which may bend and break, allowing the fish to escape. Preferably, fishers attach lures to their fishing line by means of a "leader" often made from heavier fishing line. Many lures of the prior art require the leader to be threaded in and around a series of openings, so that it crosses the lure before it is used to tie the hook to the trailing end of the lure with a specialized knot (a "Threaded Lure"). Examples include CA Pat. Appl. Nos. 2,637,822; 2,556,726; 2,626,707; and 2,599,267 to Jones (the "Early Jones Lures"); CA Pat. Appl. No. 2,047,387 and CA Pat. No. 986,306 to Gaunt (the "306 lure"); and U.S. Pat. No. 3,685,191 to Metzger. Threading the lures this way takes time, skill and patience, but more importantly, there is a risk that a game fish caught on the hook will bite through the attached leader with its vicious teeth and escape, with or without the lure. Often the hook stays lodged in its mouth, and the fish may starve or bleed to death.

Many lures of the prior art are meant for trolling, including the Early Jones Lures, and lures to Metzger, Gaunt, U.S. 2005/0252069 A1. to Pool & Spurgeon, U.S. Pat. No. 6,457, 275 to Spurgeon, and CA Pat. Appl. No. 2,681,472 to Smith & Smith. Lures designed for trolling usually do not work well for spin-casting, and the latter is popular with sports fishers because no boat is necessary, and they enjoy the challenge of trying to execute a perfect cast. One reason many lures cannot be spin-cast is that, if the leader is threaded across the lure and tied to the hook, when the lure hits the water, the hook moves out of alignment, spoiling the action of the lure. The weight and balance of trolling lures may also be unsuitable for casting.

As explained in CA 1,287,210 to Lindell & Roalson (1987), a disadvantage of many lures of the prior art is that it is difficult to continuously manually jig a fishing line to simulate the movement of a bait fish. Lindell and Roalson disclose a device to move the line automatically, but this is a complex and not inexpensive solution.

Some lures are unnecessarily complex in design, sacrificing economy and sometimes balance and smooth action for the sake of novelty—commercial fishers in particular, who use and lose lures by the score, will not likely choose such complex lures because of the cost. Consider U.S. Pat. No. 6,108,964 to Noorlander with seven different precision bends, and some of the following electric lures.

According to Pool & Spurgeon, Spurgeon, U.S. Pat. No. 7,722,218 to Leung et al. and U.S. Pat. No. 7,240,453 to Safwat, some fish are attracted by a small electrical charge or electromagnetic impulse, probably similar to that emitted by their prey, and some lures of the prior art attempt to mimic this. However, if batteries and other voltage emitters are used they may make the lure more breakable and ungainly, and throw it off balance. And many of these electric lures must seem suspiciously unnatural or even threatening to fish. Other lures rely solely on the electric charge to attract fish, such as U.S. Pat. No. 5,903,999 to Petras. But the attraction of game fish to bait fish is multi-faceted and not entirely understood, so more than one attractor should be combined in each lure. Electric lures may be made of metals such as copper or brass that corrode too quickly, especially in salt water, and batteries often short circuit. U.S. 2006/0265932 A1. to Davis, the result of federally sponsored research, is simpler than most electric attractors, but still requires a voltage generator inside a hollow lure. CA Pat. Appl. No. 2,626,707 to Jones disclosed an even simpler method, but this Early Jones Lure had vulnerable fastening means and could not be spin-cast.

The best lures are often those that move and look like a fish's natural prey. Fish are hardly known for their intelligence, but some are wily, many are particular about their food, and most are easily startled. Many lures in the prior art look nothing like bait fish. Others move very little, or in an unnatural or menacing way. See for example Spurgeon or CA Pat. Application No. 1,228,985 to Jakeway. Movements of prior art lures are often erratic or random (i.e. Gaunt's 306 lure, Gage, and CA Pat. Appl. No. 2,129,209 to Gabos & Olenek) and undependable. Descriptions of some lures are not detailed enough for the movement to be reproducible. "Formed to oscillate" as in Spurgeon, is an example. Some prior art lures supposedly move like swimming fish, such as Noorlander, or preferably injured fish, such as Metzger, Calif. Pat. No. 986,306 to Gaunt, and Gabos & Olenek, but fishers are still searching for a durable artificial lure that simulates the appearance and movement of an injured bait fish to the fullest extent possible, and induces a "reaction bite:" the game fish is stimulated to commit to reflexively strike the lure.

Game fish conserve energy by seeking out injured prey, and injured bait fish may swim in a spiral or corkscrew pattern, so many rolling actions should be attractive. However, lures of the prior art that roll primarily in one direction may wind up the fishing line until it tangles. For that reason, few lures are purposefully designed to roll. The 306 lure is an exception, and sometimes rolls in a reverse direction, but only randomly, so eventually will tangle. Some lures that roll in only one direction include the patents to Metzger, Gage, Gabos & Olenek and one of the Early Jones Lures, CA Pat. Appl. No. 2,599,267. The other Early Jones Lures overcame the tangling disadvantage, but had other disadvantages in common with the prior art.

The Early Jones Lures were Threaded Lures shaped like fish without fins or tails. The lateral surfaces were concave on one side, convex on the other, arched in a single continuous curve from nose end to hook end. The belly was bigger than the back so the lure was asymmetrical. The leader-threading openings were at 45 or 60 degree angles to the lateral surfaces. This inventive combination resulted in a lure with a rolling action. The curve had two components, a transverse bend and a twist about the longitudinal axis. Depending on the material the lure was made from and the proportions, a specific degree of bend and twist was identified (within quite narrow parameters) that resulted in a reverse roll action described hereunder. This action proved to be very attractive to fish, and resulted in a reaction bite.

There were disadvantages. None of the Early Jones Lures could be spin-cast and since they were all Threaded Lures, their fastening means were vulnerable to breakage. If the fastening means were changed, the balance and action of the lures changed, and they no longer had a reverse roll action. This problem took two years of experimentation to solve.

SUMMARY OF THE INVENTION

The present invention is a fishing lure that attracts game fish by emulating a variety of signals by which game fish recognize bait fish, and then providing means to capture and hold the game fish. Fish identify their prey by smell; by sight via characteristic colors, shapes and movements; by sound; via sensory receptors which analyze vibrations that characterize the actions of specific bait fish; and by variations in the small electric charges emitted by bait fish. Embodiments of the lure of the present invention rely on most of these signals to attract fish, and an improved fastening means to capture and hold them.

The present invention is a fishing lure that mimics the appearance of an injured bait fish. The lure has an elongated body with tapered ends, symmetrical about its longitudinal axis. The front portion of the body is planar, or flat, and extends from a preferably pointed nose for a distance of 25 to 57 percent of the total length of the body. The rear portion terminates in a preferably generally pointed tail, and has a curve with two components: a twist about the longitudinal axis of 9° to 16° and a transverse bend of 35° to 65°. The bend begins at about the midpoint of the body, at a distance from the nose that is 47 to 57 percent of the total length of the body, and extends towards the tail.

The improved fastening means overcome the disadvantages of the Threaded Lures. The fastening means are centred on the longitudinal axis, one near the nose and one near the tail. Each includes an opening, a ring through the opening, and a swivel attached to the ring. A hook is attached to the swivel by the tail and a leader to the swivel by the nose. These fastening means are an improvement because the leader is disposed away from the body of the lure and the hook so that it does not interfere with the movement of the lure, a fish caught on the hook will not bite the leader and escape, and the hook trails freely behind the body of the lure. These fastening means are almost foolproof in that no assembly is required, and an unobvious advantage is that, with this improvement, the lure works well for spin-casting because the hook remains aligned to the lure when it hits the water. Embodiments made of metal weigh enough that the lure can be cast a considerable distance.

The specific twist and bend and the balance of the lure determine the self-perpetuating reverse roll action described hereunder, first seen in some of the Early Jones Lures and recreated and improved in the lure of the present invention. This action simulates the movements of an injured bait fish, and induces a reaction bite. The moderate speed and predictability of the rolls increase the likelihood that, having lunged for the lure, the fish will actually capture it, compared to lures with more erratic action. And once the fish takes the lure, the improved fastening means keep the fish from biting through the leader and escaping. And finally, reverse rolls unwind the leader, so it will not tangle.

Further objects of the present invention are to provide a fishing lure having some or all of the following advantages in preferred embodiments a lure that:

(a) has a small electric charge, even more simply produced than by Safwat and Petras, and that overcomes the disadvantages of CA Pat. Appl. No. 2,626,707 to Jones;

(b) resembles a variety of bait fish because of its action, decoration and shape;

(c) keeps its bend even when repeatedly struck by large fish in commercial operations, because of the bend resistance of a body preferably made of metals such as tempered aluminum and steel;

(d) is strong and capable of holding a large fish, due to the tensile strength of the metal of preferred embodiments, and the fact that, with a centre of balance closer to the nose than the tail, a larger and thus stronger hook can be used in counterbalance to a given sized lure, compared to many lures of the prior art; and (e) moves more fluidly (i.e. more smoothly and gracefully). The action is improved compared to the prior art by decreasing the resistance to the free movement of rings by countersinking and slightly widening the openings. The action is also preferably improved by bevelling the edges.

The aforementioned objects are achieved individually and in combination and it is not intended that the present invention be considered as requiring two or more of the objects to be combined.

With respect to the claims hereof, and before describing the drawings and at least one preferred embodiment of the invention in detail, it is to be understood that the invention is not to be limited in its application to the details of construction and to the arrangements of the components set forth herein. The invention is capable of being created in other embodiments. Also, it is to be understood that the phraseology and terminology employed here are for the purpose of description and should not be regarded as limiting.

BRIEF DESCRIPTION OF THE DRAWINGS

These and other features of the invention will become apparent from the following description of an embodiment in which reference is made to the appended drawings wherein:

FIG. 12 shows a side plan view of the body of a second embodiment of the fishing lure according to the present invention, FIG. 13 shows a transverse cross-sectional view taken along line 42-42 of FIG. 12, FIG. 14 shows a lengthwise cross-sectional view taken along line 22-22 of FIG. 12, FIG. 15 shows a side plan view of the body of a third embodiment of the fishing lure according to the present invention, FIG. 16 shows a transverse cross-sectional view taken along line 42-42 of FIG. 15, and FIG. 17 shows a lengthwise cross-sectional view taken along line 22-22 of FIG. 15.

Figure 1:
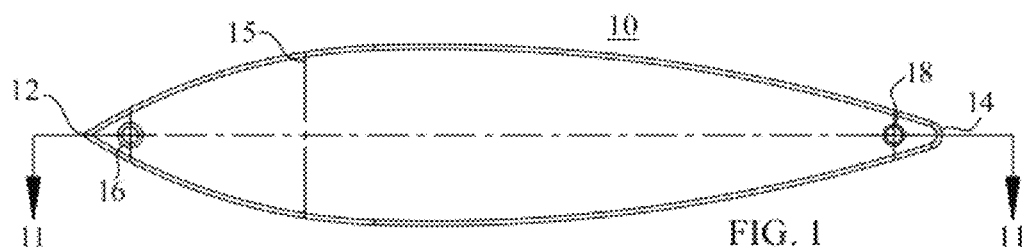
FIG. 1 shows a side plan view of a flat blank of a first embodiment of a body of a fishing lure according to the present invention.

Similar references are used in different figures to denote similar components.

DETAILED DESCRIPTION OF THE INVENTION

The following description is of preferred embodiments illustrated in FIGS. 1-17 by way of example only, and without limitation to the combination of features necessary to carry the invention into effect. Specific dimensions and other physical characteristics related to the embodiments disclosed herein are not to be considered limiting unless otherwise indicated.

These embodiments relate to a fishing lure which, when pulled slowly through the water, has the appearance and action of an injured bait fish.

The unique "reverse roll action" of the Jones Lures works as follows. When the lure is pulled through the water, the twist causes the lure to roll, preferably clockwise, winding up the leader and storing mechanical energy. If the lure is pulled slowly through water having a flow speed of a threshold value or greater, then after the lure rolls x times clockwise (where x≈4 to 6), the tension caused by the drag of a precisely calculated transverse bend, along with the weight of the correctly balanced lure, cause the leader to unwind then wind up counter-clockwise, so that the lure rolls counter-clockwise, settling into a pattern of 2x rolls in one direction, then 2x rolls in the opposite direction in about 8 to 10 seconds. The action of the lure is self-perpetuating because the twist in the lure provides its own torque or "push" to wind up the leader repeatedly as it moves through the water.

As the lure rolls, it also "swims" from side to side, because the kick that occurs in the moment between winding and unwinding orients the lure sideways. A 5 inch (12.7 cm) lure of these embodiments will have a tight roll, and depending on the tide or current in the water, may swim back and forth about a foot as it rolls. The roll, kick, reverse roll and swimming action combine into a reverse roll action like that of an injured bait fish that has proven to be very attractive to game fish.

The lure's attraction is in part because the rolls cause distinctive vibrations and create a rounded silhouette when seen from below and behind. The kick and reverse rolls create more flash and vibration and make the simulated bait fish appear injured, and the rolls and swimming action make the movement more lifelike. When the lure changes directions, the game fish believes its prey is about to escape, which leads to the reaction bite.

"Threshold value" means the following. Even calm water exerts some frontal resistance to movement of a lure, and this resistance is a component of the drag that causes the leader to unwind. The water flow speed opposing the forward movement of the lure must be at a threshold value or greater before the leader will unwind and rewind rhythmically. In the best mode of the present invention, the threshold value is zero, so the reverse roll action occurs if the lure is pulled slowly through calm water or into or across a tide or current. In other embodiments, the reverse roll action occurs only when the lure is pulled into moving water, increasing the drag. If not zero, preferably the threshold value is equivalent to the water flow speed generated at mid tide or in fresh water with a class 1+ (easy rafting) current.

Different lures are designed to be pulled at different speeds through the water. The lure of the present invention must be pulled "slowly." The user should experiment to find the trolling speed at which the reverse roll action is perfected in given water conditions. Often this turns out to be 1.5 to 2 miles per hour (2.4 to 3.2 km/hr). If pulled too quickly through the water, the lure of the present invention rolls only in one direction.

Since the lure is trolled slowly, and the reverse roll action forms a repetitive pattern and a movement that is fluid and predictable compared to the more erratic and jerky actions of most lures of the prior art, it is more likely that, having lunged for the lure, the fish will actually capture it. And the improved fastening means help ensure that once the fish is on the hook, it will not bite the leader and escape. And finally, an equal number of alternating clockwise and counter-clockwise rolls unwind the line as fast as it winds, so it will not tangle.

FIGS. 1 to 11 illustrate a first embodiment that works best when pulled into moving water. The threshold value of this embodiment is the water flow speed equivalent to ocean water at mid tide or fresh water with a class 1+ current. The lure will only roll in a reverse direction occasionally when pulled through calm water or cross current. See FIGS. 12 to 17 for embodiments with a threshold value of zero, meaning they exhibit a reverse roll action no matter how little current opposes the forward motion of the lure.

In the spring, most bait fish are juvenile and small, so game fish are attracted to a small lure, but usually these lures and the hooks they accommodate are not strong enough to hold a large game fish. FIGS. 15 to 17 illustrate an embodiment that works best as a smaller lure (1 to 3.5 inches or 2.5 to 8.9 centimeters ("cm")) and is designed to be in balance with a larger hook than the other embodiments.

FIG. 1 is a plan view of a flat blank used to make a first embodiment of the present invention. An elongated body 10 tapers or decreases in width towards the ends. Preferably the lure is shaped like a finless fish with a pointed nose 12 at one end and a generally pointed tail 14 at the other. "Generally pointed" means a point is slightly rounded for strength. The body 10 of the fishing lure is symmetrical about a central longitudinal axis 11-11 extending from nose 12 to tail 14. A latitudinal axis 15 is perpendicular to the longitudinal axis 11-11 and in this embodiment is located at a distance from the nose 12 that is 25% to 30% of the total length of the body 10. Openings 16, 18 extend through the body 10 adjacent to the nose 12 and tail 14, preferably at right angles to the lateral surfaces, and are centred on the longitudinal axis.

Figure 2:
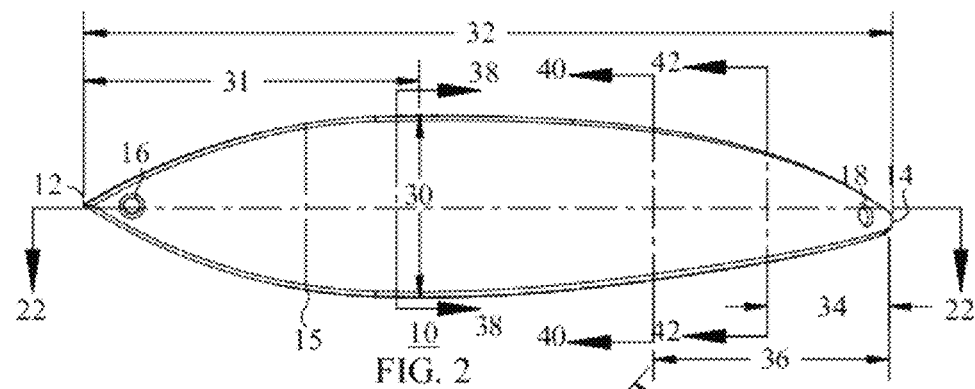
FIG. 2 shows a side plan view of the body of the first embodiment of the fishing lure according to the present invention.
Figure 3:
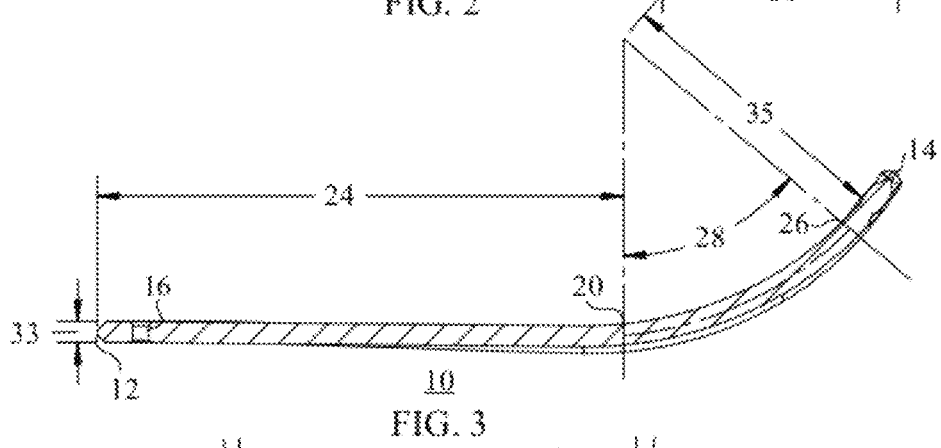
FIG. 3 shows a lengthwise cross-sectional view taken along line 22-22 of FIG. 2.

Referring to FIG. 2, a plan view of the body 10 of the lure, and FIG. 3, a lengthwise cross-section 22-22 of FIG. 2, a planar front portion extends from the nose 12 to the latitudinal axis 15. A curved rear portion extends from the latitudinal axis 15 to the tail 14. The curve is a segment of a helix, formed by laying a cylindrical rod transversely across the body 10 at an oblique angle, and bending the body 10 around the rod. The resulting smooth curve has two components: a twist and a bend. Beginning at zero degrees at the latitudinal axis 15, the rear portion is twisted about the longitudinal axis of the body 10, the angle of rotation increasing toward the tail. In this embodiment, the transverse bend 20-26 begins at a point 20 that is distant from the nose 12 by about 50 to 56% 24 of the total length of the body 10, and is an arc segment subtending an angle 28 of about 48 to 52°. The bend 20-26 encompasses 36 to 42% of the total length of the body 10. The widest part 30 of the body 10 is at a distance from the nose 12 that is in the range of 37 to 41% of the total length of the body 10 and the length to width ratio is in the range of 4.6 to 5 to one, meaning the length of the body is 4.6 to 5 times greater than its width.

Figure 4:
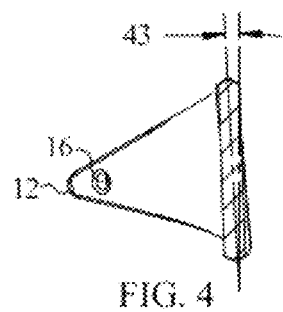
FIG. 4 shows a transverse cross-sectional view taken along line 38-38 of FIG. 2.
Figure 5:
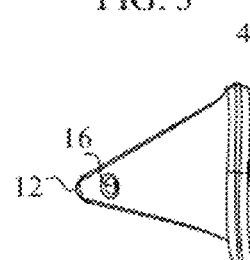
FIG. 5 shows two transverse cross-sectional views taken along line 40-40 of FIG. 2.
Figure 6:
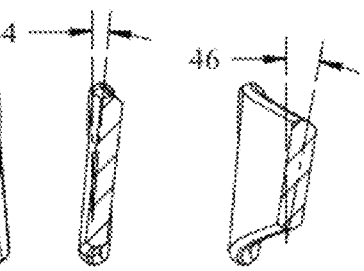
FIG. 6 shows a transverse cross-sectional view taken along line 42-42 of FIG. 2.

The twist of this embodiment is illustrated more clearly in FIGS. 4-6. FIG. 4 is a cross-section 38-38 taken at a distance from the nose 12 that is about 36% 31 of the total length of the body 10. At this point 38-38, the angle of rotation of the twist about the longitudinal axis is in the range of 1 to 2° 43. Referring to FIG. 5 the angle of rotation increases to 5.5 to 6.5° 44 at a cross-section 40-40 taken at a distance from the nose 12 that is about 28% 36 of the total length of the body 10 from the tail 14 (i.e. about 72% of the total length of the body 10 from the nose 12). Referring to FIG. 6, the angle of rotation of the twist is in the range of 9 to 9.9° 46 at a cross-section 42-42 taken at a distance 34 that is about 13 to 14% of the total length of the body 10 from the tail 14 (i.e. about 86 to 87% from the nose 12).

Figure 7:
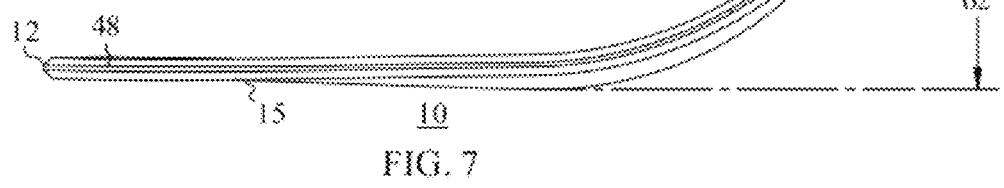
FIG. 7 shows a top elevational view of the body of the fishing lure of FIGS. 1-6.

Referring to FIG. 7, in this embodiment the edges 48 are bevelled, and then slightly rounded to form a generally pointed V-shaped edge. The bevel allows the lure to cut through the air or water with less friction, providing an aerodynamic and hydrodynamic advantage when casting and trolling respectively. The reason for rounding the point of the bevelled edge 48 is to improve the rolling action and the adhesion of the paint. Preferably the point is ground down to about $1/34^{th}$ to $1/16^{th}$ inch (0.03 to 0.06 inch or 0.0762 to 0.1524 cm) in width.

FIGS. 1, 2, 3 and 7 are approximately full size on an 8.5 by 11 inch page, showing an embodiment with a widest part 30 measuring about 1 inch (2.54 cm), a length of 5.125 inches (13.02 cm) measured along the curve (but only 4.8 inches (12.19 cm)) 32 by the shortest distance between the nose 12 and tail 14 after bending), and a thickness 33 of 0.125 inches (⅛ inch or 0.318 cm). The generally pointed tail 14 is first cut to a point, then the point is ground down until it measures about 0.125 inches (⅛ inch or 0.318 cm) across, then rounded slightly for strength and to act as a rudder. Openings 16, 18 0.09 inches (3/32 inch or 0.229 cm) in diameter extend through the body 10 and are located at a distance of 0.25 inches (¼ inch or 0.635 cm) from the rounded points of the nose 12 and tail 14, also for strength. The radius 35 of the arc segment defining the bend is 2.294 inches (about 5.827 cm), and the bend 20-26 measures about 2 inches (about 5.08 cm) following the curve. It is understood that the embodiments can be made in different sizes, generally 1 to 9 inches (2.5 to 22.9 cm) and that these measurements do not limit this embodiment.

FIGS. 8-11 illustrate the fastening means and hook of this embodiment. The openings 16, 18 accommodate attaching rings 50 and are countersunk (i.e. their edges recessed) to allow the rings 50 to slide freely through them, with less friction. Swivels 52 are attached to each ring 50. Adjacent to the nose 12, a leader (not shown)) is attached to one swivel 52; adjacent to the tail 14, a hook 54 is attached to the other swivel 52.

Figure 8:
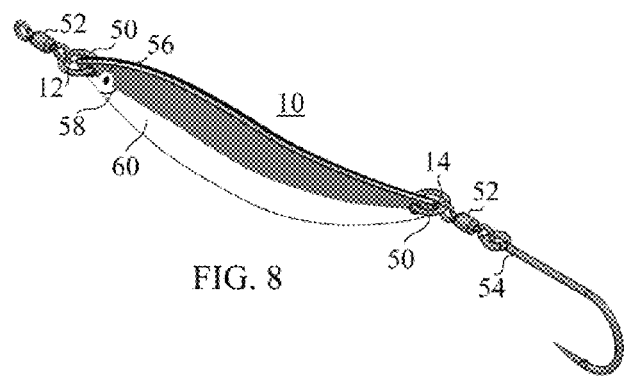
FIG. 8 shows a perspective view of the body of the fishing lure of FIGS. 1-7 with the addition of rings, swivels, a hook, and decorative details.

FIG. 8 is a perspective view that includes some of the decorative details that may be added to the lure. Preferred embodiments resemble bait fish such as herring, anchovy, mackerel and pilchard which attract salt water game fish, or bait fish such as perch and juvenile salmon and trout which attract fresh water game fish. Part of the resemblance is the unique action of the lure, part is the shape (including the length to width ratio of 4.6 to 5 to one), and part is the decoration. Unless the water is very deep or murky, specific colors and flashes of light attract fish. Metallic reflective tape 60 preferably covers a substantial portion of the outer surface of the body 10 to reflect the light, and any surface not decorated with such tape 60 is preferably colored (preferably by painting and clear-coating it) to resemble different bait fish and/or attract various game fish. Preferably reflective eyes 56 are provided on each side of the body, located adjacent to the nose 12. Curved lines, preferably red, are painted just posterior to the eyes to represent gill slits 58 (the narrow exterior openings of the respiratory organs of a fish).

An improvement arises from Jones' discovery that game fish are attracted to lures having a red eye 56 on one side and a yellow eye 56 on the other. Some game fish such as salmon strike at a school of herring or other bait fish with their tail 14, injuring one side of their prey, so one eye 56 of an injured bait fish tends to be bloodshot.

Figure 9:
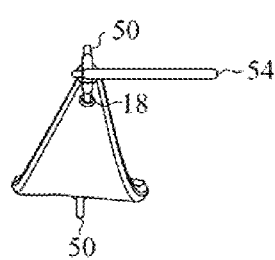
FIG. 9 shows a tail end elevational view of the fishing lure of FIG. 8.
Figure 10:
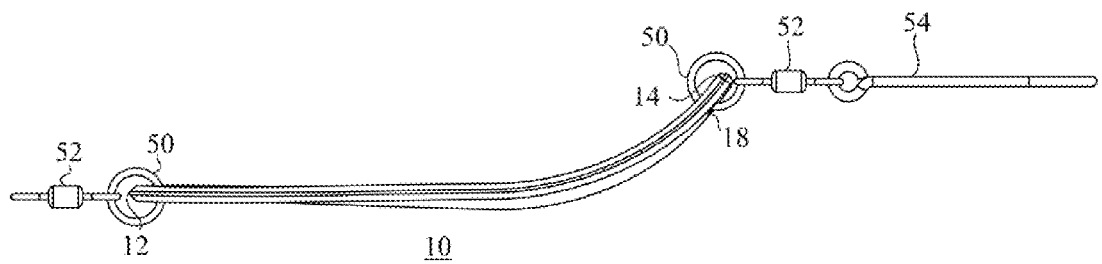
FIG. 10 shows a top elevational view of the body of the fishing lure of FIGS. 1-7 with the addition of rings, swivels, and a portion of the hook.
Figure 11:
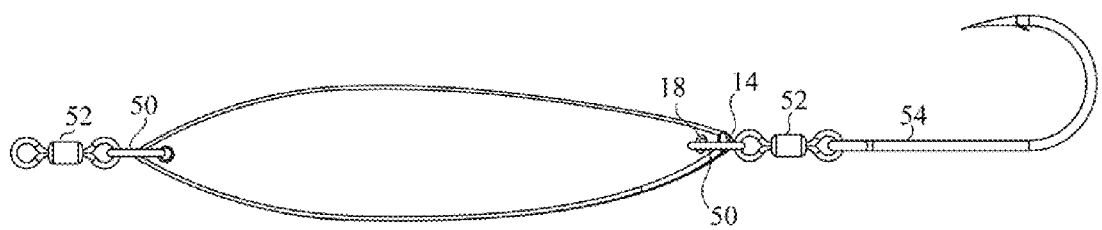
FIG. 11 shows a plan view of the fishing lure of FIG. 8, without the decorative details.

FIG. 9, a tail 14 end elevational view, also shows the slight twist to the rear portion of the body 10.

Nominal lure size is rounded to the nearest half inch up to 4 inches, then to the nearest inch. A 5 inch (12.7 cm) lure of this embodiment is preferably balanced by hardware that is sized as follows. The rings 50 should form a circle $7/16^{th}$ inch (1.11 cm) in diameter from outside edge to outside edge, while the gauge of the metal of the rings themselves is just over 1/32 of an inch (0.079 cm) in diameter. The swivels 52 should be size #1, and the hook 54 Mustad Ref. No. 95170 size 5/0. The leader is preferably 40 pound (18.14 kg) test for sports fishing, although commercial fishers often use 90 pound (40.82 kg) test. The openings 16, 18 of the leader and hook fastening means are preferably two to three times the diameter (gauge) of the rings (here, three times), as well as being countersunk, so that the rings 50 slide smoothly through the openings 16, 18, reducing friction and improving the action of the lure.

The second and third embodiments have a reverse roll action that manifests under more varied water conditions than the first embodiment. It is understood that the invention is not limited to the embodiments illustrated.

FIGS. 12-14 illustrate a second embodiment of this invention, with less bend than the third illustrated embodiment, and more twist than the first, and the twist begins considerably further back from the nose 12 compared to the first embodiment. The latitudinal axis 15, where the twist begins, is at a distance from the nose 12 that is 40 to 55% of the total length of the body. The angle of rotation 46 of the twist is 11 to 14° (approximately the maximum twist) at a cross-section 42-42 taken at a distance from the tail 14 that is in the range of 7 to 8% of the total length of the body 10. The bend 20-14 subtends an angle 28 in the range of 35 to 47° and begins at a distance 24 from the nose 12 that is 47 to 57% of the total length of the body 10. The widest part of the body (the center of balance) 30 is at a distance from the nose 12 that is 38 to 47% of the total length of the body 10. The length to width ratio is 4.6 to 5 to one. The height 62 of the bend is preferably about 16 to 17% of the length of the body 10.

If the embodiment illustrated in FIGS. 12-14 is made of ⅛ inch (0.3 cm) thick aluminum, preferably the latitudinal axis 15 is at a distance from the nose 12 that is 44 to 45% of the total length of the body 10, the twist is 13° 46, the length to width ratio is 4.8 to one, and the widest part of the body 30 is at a distance from the nose 12 that is 40 to 41% of the total length of the body. A 4 inch lure (illustrated) preferably has a bend 20-26 of 46° 28 (radius 35 2.272 inches (5.8 cm)) beginning at a distance 24 from the nose 12 that is 55% of the total length of the body 10. A 5 inch lure preferably has a bend 20-26 of 39° 28 beginning at a distance 24 from the nose 12 that is 49% of the total length of the body 10.

FIGS. 15-17 illustrate a third embodiment of this invention, preferably a smaller lure with more bend to balance one size heavier hook 54. If all else is equal, increasing the bend will tend to make a lure roll in only one direction, but the heavier hook 54 and other changes counteract this inclination. This embodiment is designed to simulate juvenile bait fish to attract large game fish in the spring, but without the larger hook, the lure could not hold a large fish. The length to width ratio also tends to be slightly greater than in the other illustrated embodiments so the lure is a little more streamlined. The latitudinal axis 15, where the twist begins, is at a distance from the nose 12 that is 40 to 46% of the total length of the body 10 and the angle of rotation 46 of the twist is 11 to 14° at a cross-section 42-42 that is at a distance from the tail 14 that is in the range of 7 to 8% of the total length of the body 10. The bend 20-14 subtends an angle 28 of 55 to 65° and begins at a distance 24 from the nose 12 that is 47 to 53% of the total length of the body 10. The widest part of the body 30 is at a distance from the nose 12 that is 39 to 43% of the total length of the body 10, but the center of balance is closer to the nose 12 than this measurement would suggest, because the tail 14 is ground down more than in the other two embodiments (not shown) to strengthen the hook fastening means. The length to width ratio is in the range of 5 to 5.3 to one. Preferably the height 62 of the bend is 19 to 21% of the length of the body 10.

The fishing lure of this invention could be made in other embodiments, but the latitudinal axis 15, will be at a distance from the nose 12 that is in the range of 25 to 57% of the total length of the body and the maximum angle of rotation 46 of the twist will be in the range of 9 to 16 degrees. The bend 20-26 will subtend an angle 28 in the range of 35 to 65 degrees and begin at a distance 24 from the nose 12 that is in the range of 47 to 57% of the total length of the body 10. Preferably the percent of the body encompassed by the bend is in the range of 34 to 53%, the widest part of the body 30 will be at a distance from the nose 12 that is in the range of 35 to 47% of the total length of the body 10, and the length to width ratio will range from 4.3 to 5.3 to one. Preferably the height 62 of the bend will range from 15 to 21% of the length of the body 10.

In the versions of these embodiments which are 1 to 3 inches (5.08 to 7.62 cm) in length, the rings 50 would be smaller compared to those of the 5 inch (12.7 cm) lure, so the openings 16, 18 could be smaller and the swivels 52 sized down proportionately. For larger than average lures, perhaps 9 inches (22.86 cm), the openings 16, 18, rings 50 and swivels 52 would be sized up to keep the lure in balance. The hooks 54 vary with each size of lure. For example, in the first and second embodiments, a five inch (12.7 cm) fishing lure would be in balance with a Mustad Ref. No. 95170 size 5/0 hook 54 and for a 4 inch (10.2 cm) lure, the hook 54 would be Mustad Ref. No. 95170 size 4/0. However, since the hooks 54 are one size larger in the third embodiment, a 3.5 inch lure would have a Mustad Ref. No. 9510XXXS size 4/0 hook 54. The thickness 33 of the body 10 might range from 1/16 to 1/4 inches (0.1588 to 0.635 cm), depending on the length of the lure. Most lures are 1/8 inch (0.3 cm) thick.

The rings 50 and swivels 52 eliminate the need to thread the leader across the body 10, minimizing the leader's interference with the action of the lure, and decreasing the likelihood of a game fish cutting the leader with its teeth, a solution to a disadvantage of the Early Jones Lures and other Threaded Lures of the prior art. The improved lure is also more versatile, as it can be either trolled or spin-cast. With the improved fastening means, when the lure is spin-cast, the hook stays centred behind the lure, a solution to another disadvantage of the prior art.

Changing the fastening means required a complete redesign and rebalancing of the lure to recreate and improve on the reverse roll action that was a feature of most of the Early Jones Lures. An advantage of this self-perpetuating action is that no special casting technique or jigging is required. The user will learn through trial and error the best speed to pull the lure through the water to achieve the optimum action, but there will generally be more action in salt than fresh water and the action will be even better if the lure is pulled against the tide or current of the water. The best mode of action is to use this lure with a leader attached to the fishing line with a swivel but no rings, and preferably the leader will be 32 inches (0.813 meters) when fishing for fast-moving fish such as Coho and Sockeye salmon, and 3 to 6 feet (0.9144 to 1.829 meters) when fishing for slower-moving fish like Spring salmon.

These embodiments are preferably made from a sheet of essentially rigid material, more preferably tempered aluminum, but can be made from other materials with similar properties, including lead or steel. Aluminum is relatively inexpensive, lighter in weight and easier to shape than many metals. Used by a person skilled in the art of fishing, the five inch (12.7 cm) lure of this embodiment, if made from 1/8 inch (0.3175 cm) tempered aluminum, can withstand the forces exerted by a 100 pound (45.36 kg) fish without breaking or losing its bend.

When the body 10 of the lure of this embodiment is made of metal, as preferred, it has a weight and balance more suitable for spin-casting than lighter lures.

Preferably the lure of the present invention generates a small charge to help attract fish. In water, particularly salt water, the electrochemical potential difference between metals leads to electrolysis, creating a charge similar to that emitted by various bait fish. Preferably the body 10 is made of a first metal, preferably aluminum, and the rings 50, swivels 52 and hook 54 are made of a second metal, preferably steel. The aluminum ion has a much greater electrode potential than steel, and the gradient causes the electrolysis of aluminum in an electrolyte such as salt water. The electrolyte allows ions to move from an anode (i.e. aluminum) to a cathode (i.e. steel). If the fishing lure is painted or covered with metallic reflective tape, it will be more visually attractive to fish and corrode less, but the charge may be smaller. As the lure becomes scratched with age and the openings are worn away by the rings, more aluminum will be exposed to the elements and electrolysis will increase, so the lure improves with age. This method of generating a charge is simpler and less expensive than some of the complex arrangements conceived in the prior art, and the balance and fluid action of the one-piece lure are not hampered by the weight of a voltage emitter or other additional hardware.

Other metals create different charges to attract different fish. For example, Coho salmon are particularly attracted to a strong electric charge, and to the aluminum/steel embodiment. Lead and steel have lower electrode potentials than aluminum, and lures made of these metals may be more attractive to fish that prefer less charge.

No flasher is required with a four inch (10.2 cm) or longer metal lure of these embodiments if metallic reflective tape 60 covers a substantial portion of the body 10 or polished metal is used for the body 10. The lure would reflect light and be heavy enough to cast effectively. Many fishers dislike using flashers as they may throw off the balance of the lure, particularly when casting, and add one more step to the assembly. The weight of a flasher often decreases the fight of a fish.

The present invention has been described with regard to preferred embodiments. However, it will be obvious to a person skilled in the art that a number of variations and modifications can be made without departing from the scope of the invention as described herein. The appended claims, properly construed, form the only limitation upon the scope of the invention.

I claim:

1. A fishing lure having a weight comprising:
   an elongated body having a total length, said body having tapered ends, a nose at one of said tapered ends and a tail at another of said tapered ends, a first lateral surface and a second lateral surface, a central longitudinal axis, a latitudinal axis perpendicular to the longitudinal axis, said body being symmetrical about the longitudinal axis and formed by
   a planar front portion extending from the nose to the latitudinal axis, said latitudinal axis being at a distance from the nose that is in the range of twenty-five to fifty-seven percent of the total length of the body;
   a rear portion beginning at the latitudinal axis and terminating at the tail, said rear portion having a curve characterized by
   a twist about the longitudinal axis, said twist beginning at the latitudinal axis and increasing from an angle of rotation of zero degrees at the latitudinal axis to an angle of rotation in the range of nine to sixteen degrees, and
   a bend transverse in relation to the longitudinal axis, said bend subtending an angle in the range of thirty-five to sixty-five degrees and characterized in that the bend begins at a distance from the nose that is in the range of forty-seven to fifty-seven percent of the total length of the body and extends towards the tail;
   a hook fastening means centred on said longitudinal axis adjacent to the tail, said hook fastening means including
   a first attaching ring,
   a first opening extending through the body to slidably accommodate said first attaching ring, and
   a first swivel slidably attached to said first attaching ring;
   a hook slidably attached to the first swivel adjacent to the tail;
   a leader fastening means centred on said longitudinal axis adjacent to the nose, said leader fastening means including
   a second attaching ring,
   a second opening extending through the body to slidably accommodate said second attaching ring, and
   a second swivel slidably attached to said second attaching ring;
   a leader attached to the second swivel adjacent to the nose such that the leader draws the body through the water, whereby the leader is disposed away from the body and the hook such that a fish caught on the hook will not bite the leader,
   the hook trails the body and is centred behind said body,
   the twist causes the fishing lure to roll in a first direction, winding up the leader, and
   if the fishing lure is pulled through water slowly, and if the water flow speed opposing a forward movement of the lure is at a threshold value for that fishing lure or greater, then the bend and the weight of the fishing lure cause the leader to unwind resulting in a reverse roll action that simulates the movements of an injured bait fish and induces a game fish to strike the fishing lure in a reaction bite.

2. The fishing lure of claim 1 wherein the body is shaped like a finless fish and wherein the nose is a pointed nose and wherein the tail is a generally pointed tail.

3. The fishing lure of claim 2 wherein a widest part of the body is at a distance from the nose that is in the range of thirty-five to forty-seven percent of the total length of the body whereby the front portion is heavier than the rear portion, and the rings, swivels and hook are sized to counterbalance the weight of the front portion and balance the fishing lure as it moves through the water.

4. The fishing lure of claim 3 wherein a length to width ratio of the body is in the range of 4.3 to 5.3 to one, whereby the fishing lure is shaped to resemble a bait fish such as a herring or anchovy.

5. The fishing lure of claim 4 wherein the openings extend from the first lateral surface to the second lateral surface and are at right angles to said first and second lateral surfaces.

6. The fishing lure of claim 5 wherein the body is formed of a first metal.

7. The fishing lure of claim 6 wherein the first metal is tempered aluminum.

8. The fishing lure of claim 6 wherein the rings, swivels and hook are formed of a second metal, whereby when the fishing lure is immersed in water electrolysis occurs such that a small electric charge develops that attracts game fish.

9. The fishing lure of claim 6 wherein:
   the latitudinal axis is at the distance from the nose that is in the range of twenty-five to thirty percent of the total length of the body,
   the twist has the angle of rotation in the range of 9 to 9.9 degrees at a distance from the nose that is in the range of eighty-six to eighty-seven percent of the total length of the body,
   the bend subtends the angle that is in the range of forty-eight to fifty-two degrees and said bend begins at the distance from the nose that is in the range of fifty to fifty-six percent of the total length of the body and encompasses thirty-six to forty-two percent of the total length of the body,
   the widest part of the body is at the distance from the nose that is in the range of thirty-seven to forty-one percent of the total length of the body, and
   the length to width ratio of the body is in the range of 4.6 to one.

10. The fishing lure of claim 6 wherein:
    the latitudinal axis is at the distance from the nose that is in the range of forty to fifty-five percent of the total length of the body,
    the twist has a maximum angle of rotation in the range of eleven to fourteen degrees,
    the bend subtends the angle that is in the range of thirty-five to forty-seven degrees and said bend begins at the distance from the nose that is in the range of forty-seven to fifty-seven percent of the total length of the body and the bend encompasses in the range of thirty-four to fifty-three percent of the total length of the body,
    the widest part of the body is at the distance from the nose that is in the range of thirty-eight to forty-seven percent of the total length of the body, and
    the length to width ratio of the body is in the range of 4.6 to 5 to one
    whereby a four inch (10.2 cm) fishing lure is in balance with the hook comprising a Mustad Ref. No. 95170 size 4/0 hook and a five inch (12.7 cm) fishing lure is in balance with the hook comprising a Mustad Ref. No.

95170 size 5/0 hook and the threshold value is zero so that the fishing lure has a reverse roll action regardless of the water flow speed.

11. The fishing lure of claim 6 wherein:
the latitudinal axis is at the distance from the nose that is in the range of forty to forty-six percent of the total length of the body,
the twist has a maximum angle of rotation in the range of eleven to fourteen degrees,
the bend subtends the angle that is in the range of fifty-five to sixty-five degrees and said bend begins at the distance from the nose that is in the range of forty-seven to fifty-three percent of the total length of the body and the bend encompasses in the range of thirty-nine to forty-three percent of the total length of the body,
the widest part of the body is at the distance from the nose that is in the range of thirty-nine to forty-three percent of the total length of the body, and
the length to width ratio of the body is in the range of 5 to 5.3 to one
whereby the threshold value is zero, a 3.5 inch (8.9 cm) lure is in balance with the hook comprising a Mustad Ref. No. 9510XXXS size 4/0 hook that can hold a large game fish, and the fishing lure simulates the appearance and action of an injured juvenile bait fish.

12. The fishing lure of claim 1 wherein the first and second openings each further comprise a center and wherein the center of the first opening is located at a distance from the tail that is one-quarter of an inch (0.635 centimeters) and the center of the second opening is located at a distance from the nose that is one-quarter of an inch (0.635 centimeters).

13. The fishing lure of claim 1 wherein the first and second openings each have a diameter which is in the range of two to three times greater than the diameter of the rings, whereby the rings slide easily through said openings, friction is reduced, and the rolls are improved.

14. The fishing lure of claim 1 wherein the first and second openings are countersunk whereby the first and second attaching rings slide more easily through said first and second openings, friction is reduced and the rolls are improved.

15. The fishing lure of claim 1 wherein the elongated body further comprises beveled edges which impart an aerodynamic and hydrodynamic advantage to the fishing lure.

16. The fishing lure of claim 15 wherein the bevelled edges form a generally pointed V-shape whereby the action of the fishing lure is improved.

17. The fishing lure of claim 1 wherein the body is decorated with at least one of the following: at least one color, metallic reflective tape covering a substantial portion of at least one of the first or second lateral surface, a reflective eye located on at least one of the first or second lateral surface adjacent to the nose, and a curved line representing a gill slit painted posterior to the eye, or any combination thereof.

18. The fishing lure of claim 1 wherein the body is decorated with two reflective eyes, with one reflective eye of said two reflective eyes located on each of the first and second lateral surfaces adjacent to the nose, wherein one of the two reflective eyes is red and the other of said two reflective eyes is yellow, whereby the fishing lure more nearly resembles an injured bait fish.

\* \* \* \* \*